United States Patent [19]

Rimlinger, Jr.

[11] Patent Number: 5,737,985
[45] Date of Patent: Apr. 14, 1998

[54] WORK HOLDER ASSEMBLY FOR A LATHE

[76] Inventor: Charles H. Rimlinger, Jr., 928 Forest Acres Ct., Nashville, Tenn. 37220

[21] Appl. No.: 680,458

[22] Filed: Jul. 15, 1996

[51] Int. Cl.$^6$ ........................................... B23B 33/00
[52] U.S. Cl. .......................... 82/165; 82/112; 279/8; 279/133
[58] Field of Search .......................... 82/112, 165, 168; 279/8, 32, 133

[56] References Cited

U.S. PATENT DOCUMENTS

| | | | |
|---|---|---|---|
| 4,140,032 | 2/1979 | Besenbruch et al. | 82/112 |
| 4,165,662 | 8/1979 | Besenbruch et al. | 82/4 A |
| 4,708,041 | 11/1987 | Granger | 82/40 R |
| 5,560,271 | 10/1996 | Duty | 82/112 |
| 5,615,589 | 4/1997 | Roach | 82/112 |

OTHER PUBLICATIONS

RELS Manufacturing Company "Brake Lathes Adaptors and Accessories" Catalog, pp. 4–6.
RELS Manufacturing Company "204 Series Brake Lathe Instruction Manual", pp. 10–11.

Primary Examiner—Daniel W. Howell
Assistant Examiner—Mark Williams
Attorney, Agent, or Firm—Chambliss, Bahner & Stophel, P.C.

[57] ABSTRACT

A work holder assembly is disclosed for securing a workpiece on a lathe having a rotary driven shaft. The workpiece has a central hole in an end wall thereof, and said end wall will be maintained in a position substantially perpendicular to the axis of rotation of the shaft. The work holder assembly includes an arbor mount comprising a substantially cylindrical tube portion having an enlarged backing plate at one end. The arbor mount is provided with a central bore, the axis of which is substantially coincident with the axis of the tube portion, which central bore is adapted to receive the shaft in sliding engagement therewith. The tube portion of the arbor mount has an outside diameter that is smaller than the diameter of the central hole in the end wall of the workpiece, while the backing plate is larger than the central hole. The work holder assembly also includes a centering cone which has a larger end and a smaller end, which larger end has a diameter that is larger than the diameter of the central hole in the end wall of the workpiece. The cone also has a central bore, the axis of which is substantially coincident with the axis of the cone, which is adapted to receive the tube portion of the arbor mount in sliding engagement therewith. The work holder assembly also includes a compression cup having a base portion and a sidewall extending from the periphery thereof. The base portion of the cup has a central hole therethrough that is adapted to receive the tube portion of the arbor mount, and the sidewall terminates in a peripheral edge that is located so as to correspond with the periphery of the backing plate. In use, the arbor mount of the invention is positioned over the shaft, and a workpiece is positioned over the arbor mount in front of the backing plate. The cone is positioned over the tube portion of the arbor mount with its smaller end preceding its larger end and secured against the end wall of the workpiece. The compression cup is positioned and secured over the arbor mount so that compressive forces may be applied to the end wall of the workpiece between the peripheral edge of the sidewall of the cup and the periphery of the backing plate.

20 Claims, 3 Drawing Sheets

5,737,985

WORK HOLDER ASSEMBLY FOR A LATHE

FIELD OF THE INVENTION

This invention relates to lathes having rotary driven shafts that are used to machine workpieces having an end wall with a central hole therein, such as brake drums and rotors. More specifically, the invention relates to a work holder assembly for such lathes that may be utilized to hold workpieces of a variety of sizes and end wall thicknesses, and having central holes of various sizes, such that the end wall of the workpiece held thereby is maintained in a position substantially perpendicular to the axis of rotation of the shaft.

BACKGROUND OF THE INVENTION

Generally, a vehicular brake is a mechanical device for retarding the motion of the vehicle by means of friction. These brakes use friction between brake surfaces that turn with the wheels and friction pads that are stationary with respect to the turning wheels to convert the kinetic energy of the moving vehicle into heat. There are tremendous forces involved in braking a vehicle, and these forces can result in the generation of considerable heat during braking, as well as the wear of the friction surfaces and pads of the brakes. Wear may be accelerated by, among other things, dirt or dust that may infiltrate the brake assembly and migrate to locations between the pads and the friction surfaces. In addition, because the friction pads in use today are no longer made with asbestos, a superior heat-dissipating material, accelerated wear due to the effects of high heat generation is more common than in the past.

Vehicles are generally equipped with drum-type or disc-type brakes. Most vehicles in use today are provided with disc-type brakes on at least the front wheels, and sometimes on all four wheels. Drum-type brakes were more commonly used in the past than they are today, but they are still utilized on the rear wheels of a significant number of vehicles.

Disc-type brakes operate by forcing friction pads (brake linings) against both sides of a rotating disc-shaped rotor. This rotor turns with the wheel of the vehicle and within a stationary housing called the caliper assembly. When the brakes are applied, hydraulic fluid causes pistons in the caliper assembly to push the friction pads against the rotating disc-shaped rotor, thereby retarding the motion of the vehicle.

The rotor is generally comprised of a pair of annular metal discs joined together by a plurality of spacers that are arranged so as to maximize the heat-dissipating area of the annular discs. The annular discs are supported by a central end wall which is disposed generally parallel to the discs. This end wall, which is typically joined to the discs by a short connecting sidewall, generally has a central hole to accommodate the spindle on which the associated wheel is mounted, and a plurality of bolt holes to accommodate the lug bolts or studs that are used to mount the wheel to the vehicle. Early rotors of disc-type brake systems were provided with a hub or raised collar around the central hole in the end wall. More recently, however, hubless rotors have been used, which are characterized by a substantially flat end wall. Many hubless rotors are of a unitary construction, wherein the end wall, adjacent sidewall and one of the annular discs are formed from a single piece of metal. Other hubless rotors are of a composite construction, wherein the end wall and adjacent sidewall are formed from a separate, usually considerably thinner, piece of metal from those which form the annular discs.

Drum-type brakes include a metal brake drum which rotates with the wheel. The drum has an internal cylindrical friction surface against which brake shoes, equipped with friction pads (brake linings), having arcuate external surfaces that correspond to the internal surface of the drum, are pushed by the action of a piston.

A brake drum is comprised of an end wall, around which is disposed a depending sidewall, the internal surface of which serves as the friction surface. This end wall generally has a central hole to accommodate the spindle on which the associated wheel is mounted, and a plurality of bolt holes to accommodate the lug bolts or studs that are used to mount the wheel to the vehicle. Early brake drums were provided with a hub or raised collar around the central hole in the end wall. More recently, however, hubless drums have been used, which are characterized by a substantially flat end wall. Some hubless drums, like rotors, are of a unitary construction, wherein the end wall and the adjacent sidewall are formed from a single piece of metal. Most hubless drums, however, are of a composite construction, wherein the end wall is formed from a separate, usually considerably thinner, piece of metal from that which forms the adjacent sidewall.

Wear, misuse or improper maintenance of brake drums and rotors can lead to damage, such as warping or the development of grooves or scoring in the friction surfaces. Such surface damage will reduce the effectiveness of the brakes by reducing the areas of such surfaces that are placed into contact with the friction pads to slow the vehicle. Warping, grooves and scoring in worn brake discs and drums may generally be removed, however, if not too deep or extensive, to restore full function to the brakes. Since rotors and drums have a significant value, refacing of the friction surfaces is economically preferably to replacement, if it can be accomplished at a reasonable cost.

A brake rotor or drum is generally removed from the vehicle and mounted on a lathe to machine or reface its friction surface or surfaces. Typically, a lathe for machining brake drums and rotors is equipped with a rotating shaft, sometimes referred to as a spindle or an arbor, on which the workpiece may be mounted, and a slide assembly on which a cutting or grinding tool may be mounted. Generally, the shaft has a threaded portion at its outer end, which shaft is insertable through the central hole in the end wall of a brake drum or rotor in order to facilitate mounting of such workpiece thereon. As the workpiece is turned on the shaft, the cutting or grinding tool is advanced, either automatically or manually, into engagement with the workpiece to trim or shave metal therefrom until the desired dimension and surface finish are obtained.

It is essential that the workpiece be mounted in a secure fashion on the lathe so that the end wall of the workpiece may be maintained in a position substantially perpendicular to the axis of rotation of the shaft while the workpiece is being machined. This will insure that the friction surface or surfaces of the workpiece will be maintained in an unvarying position relative to the cutting or grinding tool as the workpiece is rotated on the shaft, so that machining of the friction surface or surfaces may produce a smooth finish. However, since brake drums and rotors are provided in a variety of sizes to fit a variety of cars and other vehicles, the end walls of such workpieces may vary in diameter and thickness, and the central hole therein may also vary in diameter. Therefore, it is also desirable that the lathe mounting system for such workpieces possess some flexibility or adaptability to permit the mounting of workpieces having different physical configurations. Unfortunately, however, existing mounting systems have generally failed to combine security in mounting with adaptability to permit the mounting of workpieces of different types and configurations. Most of the mounting systems that permit the mounting of differently sized workpieces achieve this adaptability through a use of many components, each of which is adapted for a particular drum or rotor configuration. Such systems, requiring a large number of components in order to accommodate various configurations, are frequently too expensive for the small brake shop operator to justify.

It has been common practice to mount a workpiece on a lathe by securing it between or against one or more cones. The use of cones offers some flexibility in dealing with various center hole configurations, and it also permits the workpiece to be readily centered with respect to the central hole in its end wall. A workpiece having a hub around its central hole is typically mounted between two cones, each having a cylindrical bore therethrough, that are slidably mounted on the shaft of the lathe with the smaller ends thereof facing together and protruding into opposite sides of the hub. A hubless drum or rotor is frequently mounted using a single such cone that is employed in combination with other components. Typically, the cone is placed on the shaft with its smaller end facing the workpiece, and this smaller end of the cone is inserted into the central hole of the workpiece. A backing component may also be employed on the side of the workpiece opposite the cone, so that the workpiece will be held between the cone and the backing component. Thus, the cone and its backing component cooperate with the central hole in the end wall of the workpiece to align and hold the workpiece on the lathe.

An example of such a mounting system is described in U.S. Pat. No. 4,708,041 of Granger. The system of Granger employs a cone having a cylindrical bore therethrough, which cone is adapted to slide over a cylindrical tubular component having an enlarged cylindrical termination at one end thereof. This component, which Granger refers to as a roto-hub, also has a hollow cylindrical recess having a square cross-section within its termination at the junction of the cylindrical termination and the tubular portion. The roto-hub is mounted on the shaft of a lathe, and the drum or rotor to be machined is placed thereover. The cone, which has a small end and a large end, is then slid over the cylindrical tubular portion of the roto-hub so that its small end is received within the cylindrical recess in the cylindrical termination. However, the workpiece is secured on the shaft only by friction between the inside surface of the cone and the outside surface of the tubular portion of the roto-hub.

A similar mounting system to that of Granger, but one that is specifically designed for use in connection with hubless drums and unitary hubless rotors, is manufactured and sold by RELS Manufacturing Company of Rockford, Minn. This system is designed to fit over the arbor or shaft of a lathe. It includes a center locator comprising a substantially cylindrical tube portion having an enlarged cylindrical terminal member at one end. The center locator has a central bore that is adapted to receive the shaft in sliding engagement therewith, and the axis of the central bore is substantially coincident with the axis of the tube portion of the center locator. The tube portion has an outside diameter that is smaller than the diameter of the central hole in the end wall of the drum or rotor, and the terminal member of the locator is larger than said central hole. The system also includes a cone having a large base end and a smaller opposite end and a central bore therethrough such that the axis of the central bore is substantially coincident with the axis of the cone, said bore being adapted to receive the tube portion of the center locator in sliding engagement therewith. The cone has a diameter at its base end that is larger than the diameter of the central hole in the end wall of the drum or rotor. The terminal member also has a beveled surface extending radially outwardly from its junction with the cylindrical tube portion of the center locator. This beveled surface is disposed at an angle similar to that of the conical surface of the cone, so that the workpiece may be positioned over the center locator and the cone may be positioned over the tube portion of the center locator, with its smaller end preceding its base end and protruding through the central hole in the end wall of the workpiece to engagement with the beveled surface of the terminal member. A spacer may be placed over the cylindrical tube portion of the center locator, if necessary, and a nut is threaded over external threads on the outer end of the locator to hold the assembly in place. Similar or identical systems are made and sold by several manufacturers besides RELS, but for simplicity, a system of this type will be referred to herein as the RELS system. One advantage of the RELS system over the system of Granger is the fact that the nut of the RELS system more securely holds the cone in place against the end wall of the workpiece than does the frictional engagement between the cone and the roto-hub of Granger.

The use of a cone and an associated backing member such as is employed by the Granger system or the RELS system for hubless drums and hubless, unitary rotors may not prevent vibration of the workpiece as it is machined, because in such a system, all of the force that is applied to hold the workpiece securely is applied in the vicinity of the central hole. When the cutting or grinding tool is applied to the friction surface or surfaces of a workpiece held by such a system, the forces applied by the tool in a direction parallel to the axis of rotation at a point some distance away from the central hole may be sufficient to cause deflection or vibration in the workpiece. This deflection or vibration will be more pronounced in workpieces of composite construction, having thinner end walls than workpieces of unitary construction, and in fact such composite workpieces may be distorted or deformed under the influence of such forces. In addition, deflection or vibration in the workpiece, sometimes referred to as "chattering", precludes obtaining a smooth finish on the friction surface or surfaces. Consequently, it has sometimes been considered advantageous to provide an additional stabilizing force on the end wall of the workpiece itself in order to hold it securely with respect to the cutting or grinding tool.

One mounting system that provides such additional stabilizing force on the end wall of the workpiece was especially developed for use in connection with composite rotors by RELS Manufacturing Company of Rockford, Minn. This system employs a pair of circular plates instead of a cone and backing plate to hold the workpiece on the shaft. The RELS system for composite rotors also utilizes the center locator and the nut and spacer of the RELS system for drums that is discussed hereinabove. However, instead of using a cone to align and hold the rotor on the locator, this system uses a pair of plates, each of which is provided with a central hole that is adapted for sliding engagement with the center locator. One of the plates is substantially flat, and the other has a raised ring around its central hole. This ring is precisely sized to fit inside and to mate with the central hole in a particular rotor. Since each such plate has two sides or faces, one raised ring may be provided on each side, but each such plate can then only accommodate rotors having two specific center hole sizes. It would be necessary to have a plurality of such plates in order to be prepared to machine rotors having different center hole sizes.

Another means for providing an additional stabilizing force on the end wall of the workpiece is described in U.S.

Pat. No. 4,165,662 of Besenbruch et al. The Besenbruch system has two embodiments, one for holding a drum and one for holding a rotor. In order to mount a drum, the Besenbruch system employs as a backing member an adapter having a front face with a conical recess and a central hole therethrough so that the adapter may be fit over the shaft of the lathe. After this adapter and the drum are placed over the shaft, a cone having a cylindrical bore and a small end and a large end is fitted over the shaft so that its small end protrudes through the central hole in the end wall of the drum and is received in the adapter. A circular, rigid, anti-chatter, aligning and straightening plate having a central hole to receive the shaft is then placed over the shaft in front of the drum. The plate is provided with a plurality of threaded holes spaced therearound to receive a plurality of adjustment bolts, which bear adjustably against the circular end wall of the drum. The shaft has a threaded hole in its end, and a bolt is provided that mates with the threaded hole. A plurality of spacers are placed over the bolt and the bolt is threaded into the end of the shaft.

The Besenbruch system for rotors includes a pair of cones, each having a cylindrical bore and a small end and a large end, as well as a cylindrical adapter having a central bore and a conical end face. One cone is fitted over the shaft so that its small end faces outwardly. The cylindrical adapter is then placed over the shaft so that the small end of the first cone protrudes into its central bore, and the rotor is placed in front of the adapter. The second cone is then placed over the shaft so that its small end protrudes through the central hole in the end wall of the rotor and is received in the cylindrical adapter. A circular, rigid, anti-chatter, aligning and straightening plate that is essentially identical to the one employed for drums is then placed over the shaft in front of the drum. The plate, like the one for drums, is provided with a plurality of threaded holes spaced therearound to receive a plurality of adjustment bolts, which bear adjustably against the circular end wall of the rotor. The shaft has a threaded hole in its end, and a bolt is provided that mates with the threaded hole. A plurality of spacers are placed over the bolt and the bolt is threaded into the end of the shaft. When either of the Besenbruch systems are installed to hold a workpiece on a lathe, the various adjustment bolts must each be adjusted to apply a stabilizing force to the end wall of the workpiece in order for the anti-chatter plate to be effective. Furthermore, it is frequently necessary to adjust the bolts, turn the workpiece on the lathe to check for vibration and adjust the bolts again to eliminate it. Several adjustment steps may be required before machining of the workpiece can proceed.

Another means for providing a stabilizing force on the end wall of a workpiece was devised primarily for use in connection with workpieces of unitary construction, having relatively thick end walls. This mounting means employs a cone that is placed on the shaft with its small end protruding into the central hole of the end wall of the workpiece, and a pair of bell-shaped clamps that are placed on the shaft with their open "bell" ends facing the end wall, one on each side. A spring may also be placed between one of the bell clamps and the cone to maintain the cone in place in contact with the central hole in the end wall of the workpiece. Suitable spacers are placed over the shaft outside the outer bell clamp and a nut is fastened onto the externally-threaded outer end of the shaft. The bell clamps are thereby secured in place on the shaft, each in contact with one side of the end wall of the workpiece, although generally, the configuration of the "bell" ends is such that only a part thereof will be in contact with the end wall.

This means of mounting a workpiece on the rotary shaft of a lathe may be acceptable for use in mounting brake drums and rotors of unitary construction, because it applies a stabilizing force at several widely separated points on the end wall. However, such mounting means may not be suitable for use with the newer drums and rotors of composite construction. As has been mentioned, the thinner end walls of composite drums and rotors are more likely to be subject to vibration and deflection during machining that are the thicker end walls of workpieces of unitary construction. Therefore, the bell clamps generally do not apply sufficient force to the thin end walls of composite workpieces to maintain them in a stable position with respect to the cutting or grinding tool. Consequently, the workpieces will be subject to vibration or chattering, which precludes obtaining a smooth finish on the friction surface or surfaces.

In order to eliminate vibration and chattering in the end walls of composite drums and rotors, it is necessary to apply a greater force to the end walls than can readily be applied by the bell clamps, without causing distortion of the shaft. As has been mentioned, the bell clamps were designed to provide a stabilizing force or forces to the end wall of a workpiece. They were not designed to provide a larger force, a compressive force, such as is generally required to prevent or eliminate chattering. One reason that the bell clamps do not provide sufficient force to hold the end walls is that they are fastened in place by means of a nut that is threaded onto the externally-threaded outer end of the arbor or shaft. This arbor is generally designed so that the nut on its threaded end may be used to hold a workpiece or an adapter in place thereon, but it is not generally suitable for the application of compressive forces to items mounted thereon. If it is desired to tighten the nut so as to apply a compressive force thereby, care must be taken to avoid overtightening that warps the end of the shaft so that it is no longer properly aligned with its axis of rotation. Another reason that the bell clamps do not provide sufficient compressive force to hold the thin end walls is due to the wide spacing of the stabilizing forces which they apply to the end wall. As has been mentioned, the bell clamps generally have gaps in their contact surfaces, or the surfaces that contact the end wall of the workpiece. These gaps are designed to reduce the surface area in contact with the end wall so that the minimal force applicable through the tightening of the arbor nut will be translated into a sufficient force per unit area that will serve to stabilize the workpiece on the arbor. However, this stabilizing force is generally not sufficient to prevent vibration and chattering in workpieces having thin end walls as such workpieces are machined. In addition, this stabilizing force is frequently inadequate to hold the workpiece securely so as to prevent it from slipping as its friction surface or surfaces are machined on the shaft.

It would be desirable, therefore, if a system could be developed that would be suitable for securing a workpiece of unitary or composite construction and having a central hole in an end wall thereof on a lathe having a rotary driven shaft, such that said end wall is maintained in a position substantially perpendicular to the axis of rotation of the shaft. It would also be desirable if such a system could be developed that would be suitable for mounting workpieces having a variety of end wall sizes and thicknesses, and having a variety of central hole sizes, without requiring a separate adapter for each of the various sizes and end wall configurations.

It would also be desirable if such a system could be developed that would be suitable for mounting both drums and rotors in the same fashion. It would also be desirable if such a system could be developed that is capable of applying a compressive force to the end wall of the workpiece in order to eliminate vibration without the risk of warping the shaft of the lathe. It would also be desirable if such a system could be developed that would not require that several adjustment steps be taken to eliminate chattering in the end wall of the workpiece. It would also be desirable if such a system could be developed that would be compatible with existing systems for mounting of workpieces.

OBJECTS AND ADVANTAGES OF THE INVENTION

Accordingly, it is an object of the invention claimed herein to provide a system for securing a workpiece of unitary or composite construction and having a central hole in an end wall thereof on a lathe having a rotary driven shaft, such that said end wall is maintained in a position substantially perpendicular to the axis of rotation of the shaft. It is another object of the invention to provide a system that is suitable for mounting workpieces having a variety of end wall configurations and central hole sizes, without requiring a separate adapter for each of the various sizes and configurations. It is yet another object of the invention to provide a mounting system that is suitable for mounting both drums and rotors in the same fashion. Another object of the invention is to provide such a system that is capable of applying a compressive force to the end wall of the workpiece in order to eliminate vibration, without the risk of warping the shaft of the lathe. It is still another object of the invention to provide a mounting system that does not require that several adjustment steps be taken to eliminate chattering in the end wall of the workpiece. It is also an object of the invention to provide a mounting system that is compatible with the known RELS systems for mounting of rotors and drums, in that it employs some of the same components of the RELS systems.

Additional objects and advantages of this invention will become apparent from an examination of the drawings and the ensuing description.

SUMMARY OF THE INVENTION

A work holder assembly is provided for securing a workpiece having a central hole in an end wall thereof on a lathe having a rotary driven shaft, such that said end wall is maintained in a position substantially perpendicular to the axis of rotation of the shaft. The assembly includes an arbor mount comprising a substantially cylindrical tube portion having an enlarged backing plate at one end thereof. The arbor mount has a central bore therethrough such that the axis of the central bore is substantially coincident with the axis of the tube portion, which central bore is adapted to receive the arbor or shaft in sliding engagement therewith. The tube portion of the arbor mount has an outside diameter that is smaller than the diameter of the central hole in the end wall of the workpiece, and the backing plate is larger than said central hole. In use, the arbor mount of the invention may be positioned over the shaft, and the workpiece may be positioned over the arbor mount in front of the backing plate. The assembly also includes a centering cone having a larger end and a smaller end, with its larger end having a diameter that is larger than the diameter of the central hole in the end wall of the workpiece. The cone also has a central bore therethrough such that the axis of the central bore is substantially coincident with the axis of the cone, said bore being adapted to receive the tube portion of the arbor mount in sliding engagement therewith. The cone may be positioned over the tube portion of the arbor mount with its smaller end preceding its larger end, and a means is also provided to hold the cone securely against the end wall of the workpiece at the central hole thereof. The assembly also includes a compression cup having a base portion and a sidewall extending from the periphery thereof, said sidewall terminating in a peripheral edge that is located so as to correspond with the periphery of the backing plate. The base portion of the cup has a central hole therethrough that is adapted to receive the tube portion of the arbor mount. The compression cup may be positioned and secured over the arbor mount so that compressive forces may be applied to the end wall of the workpiece between the peripheral edge of the sidewall of the cup and the periphery of the backing plate.

In order to facilitate an understanding of the invention, a preferred embodiment of the invention is illustrated in the drawings, and a detailed description thereof follows. It is not intended, however, that the invention be limited to the particular embodiment described or to use in connection with the particular apparatus described or illustrated herein. Various changes are contemplated such as would ordinarily occur to one skilled in the art to which the invention relates.

DESCRIPTION OF THE PREFERRED EMBODIMENT

Figure 1:
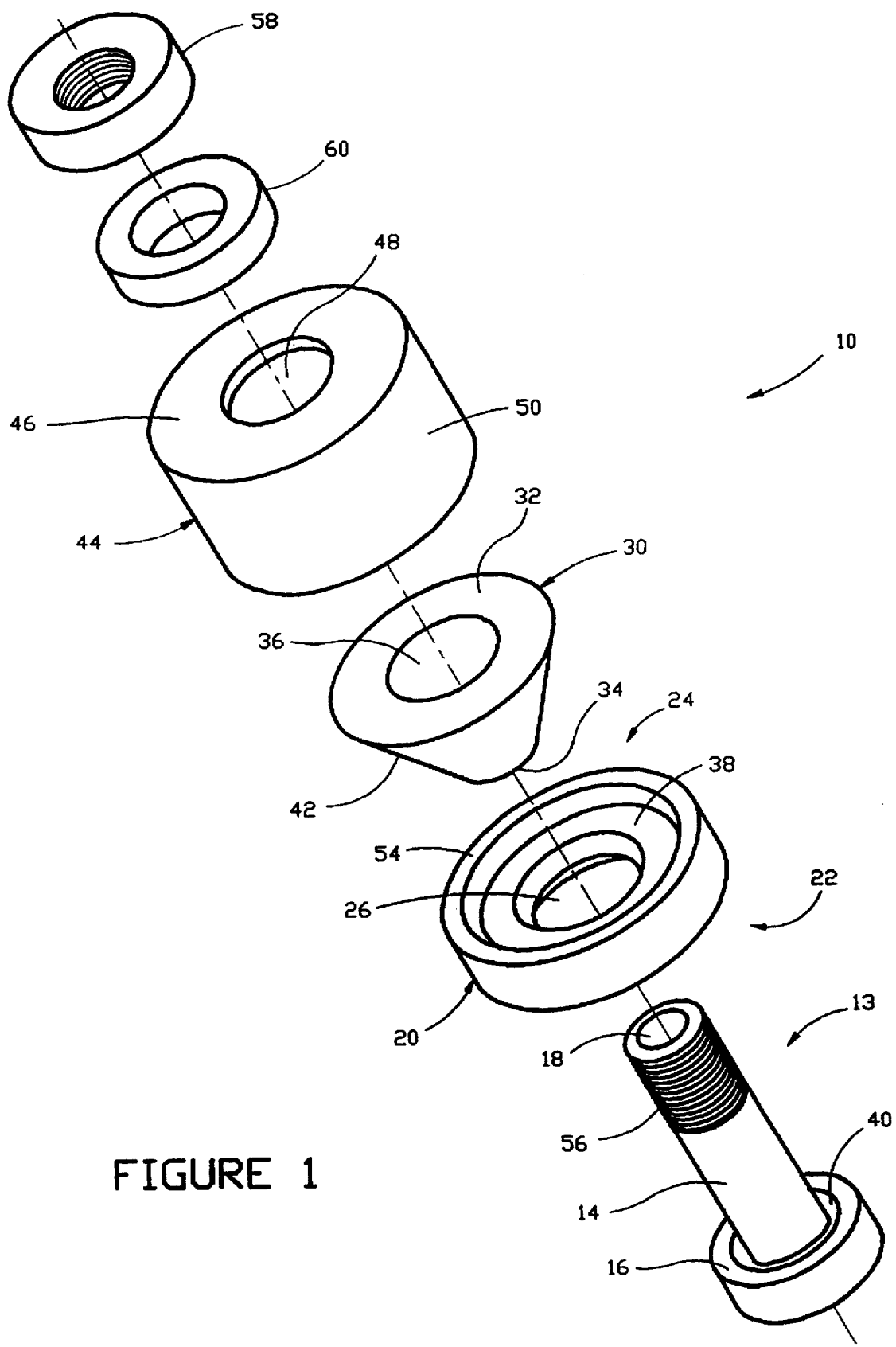
FIG. 1 is an exploded perspective view of a preferred embodiment of the invention.
Figure 2:
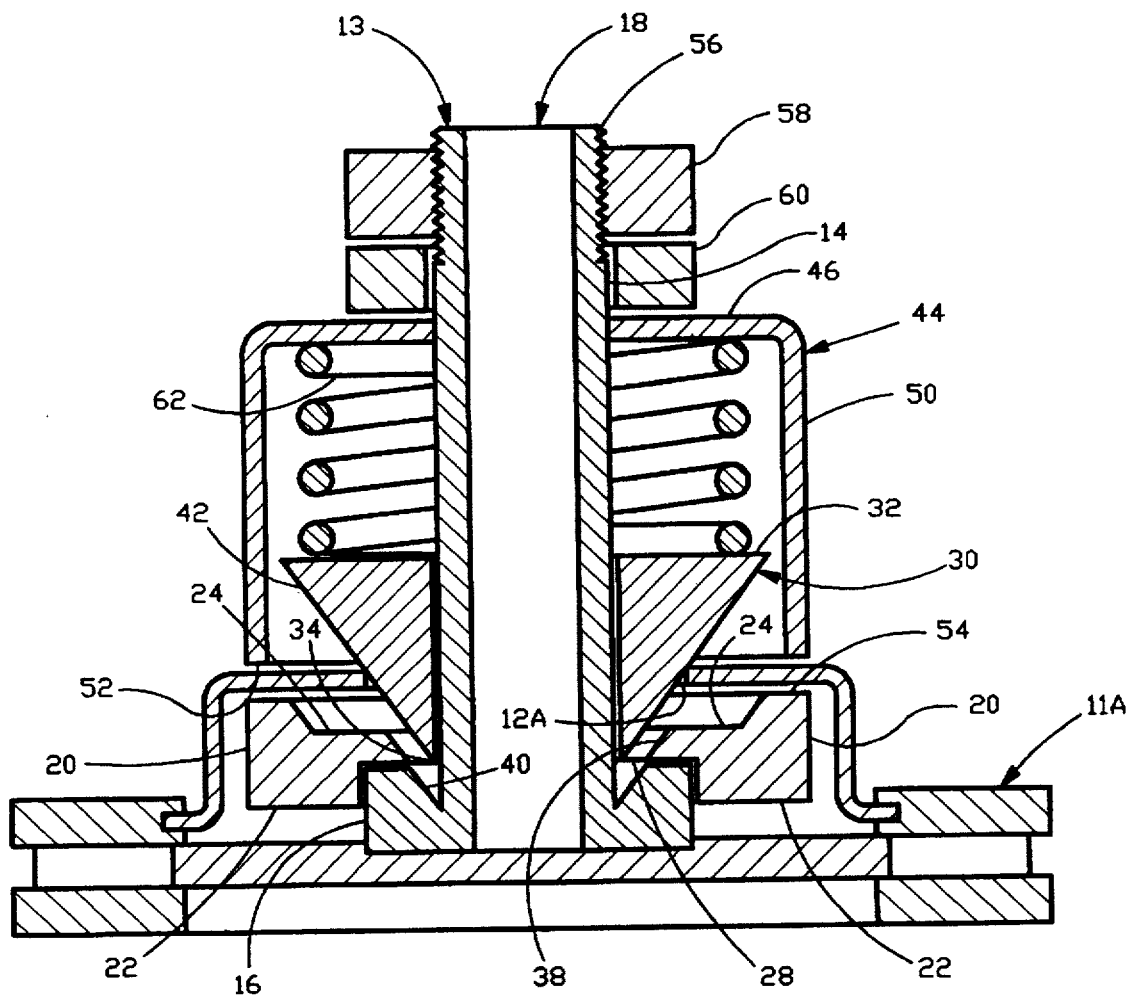
FIG. 2 is a cross-sectional view of the preferred embodiment of FIG. 1, illustrating its use in holding on the shaft of a lathe a workpiece having a central hole in the end wall thereof that is smaller in diameter than the diameter of the central hole in the backing plate that is a component of the invention.
Figure 3:
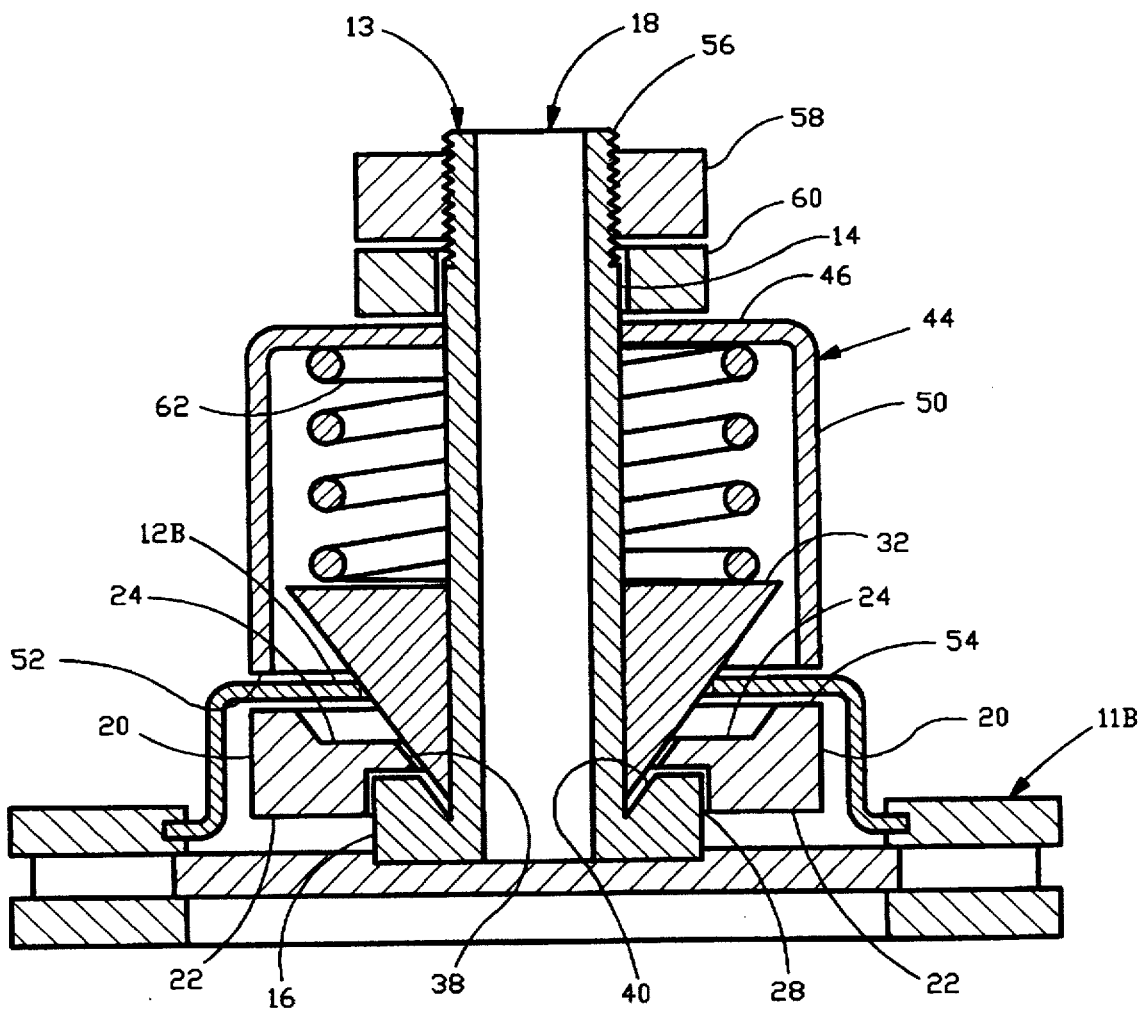
FIG. 3 is a cross-sectional view of the preferred embodiment of FIG. 1, illustrating its use in holding on the shaft of a lathe a workpiece having a central hole in the end wall thereof that is larger in diameter than the diameter of the central hole in the backing plate that is a component of the invention.

FIG. 1 shows the various components of work holder assembly 10, a preferred embodiment of the invention, that may be used to hold and secure a workpiece having a central hole in an end wall thereof on a lathe having a rotary driven shaft (not shown). FIG. 2 shows the components of the work holder assembly as they may used in a cooperative fashion to hold a workpiece having a central hole in its end wall of relatively small size, such as composite brake rotor assembly 11A having end wall 12A. FIG. 3 shows the components of the work holder assembly as they may be used in a cooperative fashion to hold a workpiece having a central hole in its end wall of relatively large size, such as composite rotor assembly 11B having end wall 12B. As shown and described herein, work holder assembly 10 may be utilized to hold a workpiece (such as rotor 11A or rotor 11B) such that its end wall is maintained in a position substantially perpendicular to the axis of rotation of the shaft. Both workpieces illustrated in the drawings (rotor 11A and rotor 11B) are of the composite type, wherein the end walls 12A and 12B and their adjacent sidewalls are formed from a separate, thinner piece of metal from those which form the annular discs, although the invention is not limited to use with such types of workpieces.

Assembly 10 is designed to be utilized with an arbor, spindle or shaft of a lathe, and as used herein, the terms "arbor", "spindle" and "shaft" are considered to be interchangeable alternatives. Assembly 10 may be used on or in connection with a variety of lathes, one of which, for example, is the brake lathe which is described and shown in U.S. Pat. No. 2,891,435 of Billeter. This lathe, which is well-known and in common use, is manufactured and sold by Ammco Tools, Inc. of North Chicago, Ill. For information about the operation and use of this lathe, reference is made to the aforementioned patent of Billeter.

Assembly 10 includes arbor mount 13 comprising a substantially cylindrical tube portion 14 having an enlarged terminal member 16 at one end. Arbor mount 13 also has a central bore 18 therethrough such that the axis of the central bore is substantially coincident with the axis of tube portion 14. Central bore 18 of arbor mount 13 is adapted to receive the shaft of a lathe (not shown) in sliding engagement therewith. As viewed in FIG. 1, the arbor mount would slide over the outer end of the shaft of a lathe (not shown) in the direction towards the extreme lower rightmost corner of the page, and be secured thereon by any convenient means, such as a conventional arbor nut (also not shown). Tube portion 14 has an outside diameter that is smaller than the diameter of the central hole in the end wall of the workpiece to be held by assembly 10, so as to insure that the tube portion of the assembly will pass through the central hole in the end wall (not shown in FIG. 1) of a workpiece to be held in place on the shaft of a lathe. Arbor mount 13 may be identical to the center locator that is manufactured and sold by RELS Manufacturing Company for use with its mounting systems for hubless drums and hubless rotors.

Assembly 10 also includes backing plate 20 having a first side 22 and a second side 24 and a central hole 26 therethrough, which hole has a diameter that is larger than the outside diameter of the tube portion of the arbor mount, so that tube portion 14 will pass through hole 26. On first side 22 of backing plate 20 is located a central recess 28 around hole 26, which recess is adapted to receive in mating relationship terminal member 16 of arbor mount 13. Preferably, terminal member 16 and recess 28 are substantially circular, although they may be of any convenient shape.

In the alternative, backing plate 20 can be combined with terminal member 16 of the arbor mount in a unitary construction. The advantage, however, in utilizing a separate backing plate lies in the fact that a backing plate that is slightly smaller in diameter than the end wall of the workpiece will provide the best results. Therefore, it may be desirable for a user of the invention who expects to machine workpieces of varying sizes to maintain a few backing plates of appropriate size, all of which may be utilized with the same arbor mount.

Assembly 10 also includes centering cone 30 having a larger end 32 and a smaller end 34 and a central bore 36 therethrough such that the axis of the central bore is substantially coincident with the axis of the cone. Central bore 36 of cone 30 is adapted to receive the tube portion of the arbor mount in sliding engagement therewith. Cone 30 may be identical to the cone that is manufactured and sold by RELS Manufacturing Company for use with its mounting system for hubless drums and hubless, unitary rotors. It has a diameter at larger end 32 that is larger than the diameter of central hole 26 in backing plate 20, and larger than the diameter of the central hole in the end wall of the workpiece. It also has a diameter at its smaller end 34 that is smaller than the diameter of central hole 26 in backing plate 20.

Preferably, backing plate 20 has on its second side a beveled surface 38 extending radially outwardly from central hole 26, and terminal member 16 of arbor mount 13 is provided with a beveled surface 40 that is substantially parallel to and in alignment with beveled surface 38. The provision of these beveled surfaces will accommodate the cone and will allow it to protrude further into the central hole than would otherwise be possible. This increases the flexibility of the system and permits its use in connection with workpieces having central holes of various sizes in their end walls. An examination of FIGS. 2 and 3 will show how the invention may be used to hold workpieces having central holes of different sizes in their end walls. FIG. 2 illustrates how the invention may be used to hold workpiece 11A, having a central hole in its end wall 12A that has a smaller diameter than that of the central hole in backing plate 20. FIG. 3, on the other hand, illustrates how the invention may be used to hold workpiece 11B, having a central hole in its end wall 12B that has a larger diameter than that of the central hole in backing plate 20. As used herein, "the diameter of the central hole in backing plate 20" refers to the diameter at the innermost edge of beveled surface 38.

Preferred results have been obtained when the angle of the beveled surface extending radially outwardly from the central hole in the second side of the backing plate is within the range of about 40 to about 50 degrees, and most preferably about 45 degrees. It is also preferred that the angle of the beveled surface in the terminal member match or correspond with the angle of the beveled surface in the backing plate. Furthermore, it is also preferred that the cone comprise a portion of a right circular cone, and that the angle between the axis of the cone and the conical surface 42 substantially corresponds to the angle of the beveled surface in the backing plate. These preferred configurations will allow the cone, the backing plate and the arbor mount to be utilized to hold a workpiece having a relatively large central hole in its end wall, such as is illustrated in FIG. 3. Furthermore, these preferred configurations will allow more contact between bevelled surfaces 38 and 40 and conical surface 42 in such circumstance, which will increase the stability of the workpiece mount.

Assembly 10 also includes compression cup 44 having a base portion 46 with central hole 48 therethrough, which is adapted to receive tube portion 14 of arbor mount 13. Compression cup 44 is also provided with sidewall 50 extending from the periphery of the base portion. This sidewall terminates in a peripheral edge 52 that is located so as to correspond with the periphery of the backing plate. This alignment of peripheral edge 52 and the periphery of the backing plate, with end wall 12A (FIG. 2) or 12B (FIG. 3) of the workpiece therebetween, permits compression cup 44 to be utilized to apply compressive forces to the end wall of the workpiece at locations away from its central hole. Preferably, as shown in the drawings, backing plate 20 is provided with a raised portion 54 around the periphery thereof, and peripheral edge 52 of the sidewall of the compression cup is located so as to correspond with said raised portion. This configuration of the components of the invention permits the application of compressive forces substantially all of the way around the end wall of the workpiece, and it also permits the compressive forces to be confined to the area of the end wall of the workpiece between edge 52 and portion 54, so that the compressive force per unit area may thereby be increased. In use, as shown in FIGS. 2 and 3, compression cup 44 is positioned and secured by any convenient means over the arbor mount in such fashion that compressive forces may be applied to the end wall of the workpiece between the peripheral edge of the sidewall of the cup and the periphery of the backing plate. Preferably, the end of tube portion 14 of the arbor mount opposite terminal member 16, identified in the drawings as end 56, is provided with external threads so that nut 58 may be utilized to secure the compression cup over the arbor mount and against the end wall of the workpiece. As nut 58 is tightened down on assembly 10, compressive forces will be applied to the end wall of the workpiece. Since nut 58 is tightened onto the arbor mount instead of onto the arbor or shaft itself, there is no risk of overtightening that could warp the shaft, as may occur when bell clamps are secured on the shaft by the arbor nut.

The invention also contemplates that spacer 60, having a hole therethrough that is adapted to receive the tube portion of the arbor mount, may be placed over the arbor mount between the compression cup and the nut, if required to insure that nut 58 may engage the threads on end 56 of the tube portion of arbor mount 13 to apply a compressive force to the end wall of the workpiece. Spacer 60 and nut 58 may also be provided in a single, unitary piece, if desired, although such an embodiment is not illustrated in the drawings.

The invention also provides for holding the cone securely against the end wall of the workpiece at its central hole. This will insure that the workpiece is properly aligned on the arbor mount. The cone may be held in such secure position by the provision of a tight frictional fit between the cone and the tube portion of the arbor mount, or by means of the use of an additional component in the assembly. Such additional components may comprise a spring, or one or more spring-like metal clips or the like (not shown) that may be placed inside the cup so that the inside of base portion 46 will compress the spring (or other component) against the larger end of the cone. If such additional components are employed, they will serve to apply a force to the end wall of the workpiece that will supplement that provided by the compression cup.

Preferred results may be obtained if the compression cup is provided with a spring, such as spring 62 (not shown in FIG. 1), that is adapted to bear against the larger end of the cone so as to maintain the cone in position against the end wall of the workpiece. Spring 62 may be permanently attached to the inside of base portion 46 of compression cup 44, if desired, by any convenient means, such as by welding or by the use of mechanical retaining clips (not shown). In addition, the portion of the spring that is in contact with the inside of base portion 46 of compression cup 44 may be received in a groove that is cut into the inside of base portion 46, although such embodiment of the invention is not illustrated in the drawings. In such case, the spring may be maintained in place inside the cup by one or more screws (not shown) that are located beside the spring groove and disposed to hold the spring securely therein.

As mentioned previously, FIG. 3 illustrates how the invention may be used to hold workpiece 11B, having a central hole in its end wall 12B that has a larger diameter than that of the central hole in backing plate 20. If end wall 12B is very thin, the application of compressive force thereto according to the invention may cause some elastic deflection in the end wall, although such is not shown in the drawing. Such deflection may be accommodated by the difference in elevation between the main portion of the second side 24 of the backing plate and raised portion 54 around the periphery thereof.

As described herein, the invention may be suitable for holding workpieces such as brake drums and rotors on the shaft of a rotary driven lathe for machining, regardless of whether the workpieces are of unitary or composite construction. The invention may also hold such workpieces having central holes in their end walls that vary in diameter over a relatively wide range. If the standard RELS system components are used as the arbor mount, cone, spacer and nut, the invention can be utilized to machine brake drums and rotors that are commonly used on nearly all automobiles, as well as on most trucks up to about a 2-ton capacity.

Although this description contains many specifics, these should not be construed as limiting the scope of the invention but as merely providing illustrations of some of the presently preferred embodiments thereof, as well as the best mode contemplated by the inventor for carrying out the invention. The invention, as described herein, is susceptible to various modifications and adaptations, and the same are intended to be comprehended within the meaning and range of equivalents of the appended claims.

What is claimed is:

1. A work holder assembly for securing a workpiece having a central hole in an end wall thereof on a lathe having a rotary driven shaft, such that said end wall is maintained in a position substantially perpendicular to the axis of rotation of the shaft, said assembly comprising:

(a) an arbor mount comprising a substantially cylindrical tube portion having an enlarged backing plate at one end thereof and having a central bore therethrough such that the axis of the central bore of the arbor mount is substantially coincident with the axis of the tube portion, said central bore of the arbor mount being adapted to receive the shaft in sliding engagement therewith, and said tube portion having an outside diameter that is smaller than the diameter of the central hole in the end wall of the workpiece, and said backing plate being larger than said central hole;

(b) a centering cone having a larger end and a smaller end, and having a central bore therethrough such that the axis of the central bore of the centering cone is substantially coincident with the axis of the cone, said bore of the centering cone being adapted to receive the tube portion of the arbor mount in sliding engagement therewith, said cone having a diameter at its larger end that is larger than the diameter of the central hole in the end wall of the workpiece; and (c) means for securing the cone against the end wall of the workpiece; and (d) a compression cup having a base portion and a sidewall extending from the periphery thereof, said base portion having a central hole therethrough that is adapted to receive the tube portion of the arbor mount, and said sidewall terminating in a peripheral edge that is located so as to correspond with the periphery of the backing plate; whereby:

(e) the arbor mount may be positioned over the shaft; and (f) the workpiece may be positioned over the arbor mount in front of the backing plate; and (g) the cone may be positioned over the tube portion of the arbor mount with its smaller end preceding its larger end and secured against the end wall of the workpiece; and (h) the compression cup may be positioned and secured over the arbor mount so that compressive forces may be applied to the end wall of the workpiece between the peripheral edge of the sidewall of the cup and the periphery of the backing plate.

2. The assembly of claim 1, wherein the backing plate is provided with a raised portion around the periphery thereof, and wherein the sidewall of the compression cup terminates in a peripheral edge that is located so as to correspond with said raised portion.

3. The assembly of claim 1, wherein the backing plate is provided with a beveled surface extending from the juncture of the tube portion and the backing plate radially outwardly and axially towards the opposite end of the tube portion.

4. The assembly of claim 3, wherein the angle of the beveled surface of the backing plate is within the range of about 40 to about 50 degrees.

5. The assembly of claim 3, wherein the cone comprises a portion of a right circular cone, and wherein the angle between the axis of the cone and the conical surface, substantially corresponds to the angle of the beveled surface of the backing plate.

6. The assembly of claim 1, wherein the end of the tube portion of the arbor mount opposite the backing plate is provided with external threads so that a nut may be utilized to secure the compression cup over the arbor mount and against the end wall of the workpiece.

7. The assembly of claim 6, wherein a spacer, having a hole therethrough that is adapted to receive the tube portion of the arbor mount, is placed over the arbor mount between the base of the cone and the nut.

8. The assembly of claim 6, wherein the nut is provided with a unitary spacer portion.

9. The assembly of claim 1, wherein the means for securing the cone against the end wall of the workpiece comprises a spring that is adapted to be compressed between the inside of the compression cup and the larger end of the cone.

10. The assembly of claim 1, wherein the compression cup is provided with an integral spring that is adapted to bear against the larger end of the cone so as to secure the cone in position against the end wall of the workpiece.

11. A work holder assembly for securing a workpiece having a central hole in an end wall thereof on a lathe having a rotary driven shaft, such that said end wall is maintained in a position substantially perpendicular to the axis of rotation of the shaft, said assembly comprising:

(a) an arbor mount comprising a substantially cylindrical tube portion having an enlarged terminal member at one end thereof and having a central bore therethrough such that the axis of the central bore of the arbor mount is substantially coincident with the axis of the tube portion, said central bore of the arbor mount being adapted to receive the shaft in sliding engagement therewith, and said tube portion having an outside diameter that is smaller than the diameter of the central hole in the end wall of the workpiece;

(b) a backing plate having a first side and a second side and being of a size that will not pass through the central hole in the end wall of the workpiece, said backing plate having:
 (1) a central hole therethrough, which hole has a diameter that is larger than the outside diameter of the tube portion of the arbor mount; and
 (2) on its first side a central recess around said hole, which recess is adapted to receive in mating relationship the terminal member of the arbor mount, and
 (3) on its second side a raised portion around the periphery thereof, and a beveled surface extending radially outwardly from the central hole;

(c) a cone having a larger end and a smaller end and a central bore therethrough such that the axis of the central bore of the cone is substantially coincident with the axis of the cone, said bore of the cone being adapted to receive the tube portion of the arbor mount in sliding engagement therewith, said cone having:
 (1) a diameter at its larger end that is larger than the diameter of the central hole in the backing plate, and larger than the diameter of the central hole in the end wall of the workpiece; and
 (2) a diameter at its smaller end that is smaller than the diameter of the central hole in the backing plate;

(d) means for securing the cone against the end wall of the workpiece; and (e) a compression cup having a base portion and a sidewall extending from the periphery thereof, said base portion having a central hole therethrough that is adapted to receive the tube portion of the arbor mount, and said sidewall terminating in a peripheral edge that is located so as to correspond with the raised portion around the periphery of the second side of the backing plate; whereby:

(f) the arbor mount may be positioned over the shaft with the backing plate in mating relationship therewith; and (g) the workpiece may be positioned over the arbor mount in front of the backing plate; and (h) the cone may be positioned over the tube portion of the arbor mount, with its smaller end preceding its larger end and secured against the end wall of the workpiece; and (i) the compression cup may be positioned and secured over the arbor mount so that compressive forces may be applied to the end wall of the workpiece between the peripheral edge of the sidewall of the cup and the raised portion around the periphery of the second side of the backing plate.

12. The assembly of claim 11, wherein the cone comprises a portion of a right circular cone, and wherein the angle between the axis of the cone and the conical surface, substantially corresponds to the angle of the beveled surface extending radially outwardly from the central hole in the second side of the backing plate.

13. The assembly of claim 12, wherein the terminal member of the arbor mount is provided with a beveled surface that is substantially parallel to and in alignment with the beveled surface extending radially outwardly from the central hole in the second side of the backing plate.

14. The assembly of claim 12, wherein the angle of the beveled surface extending radially outwardly from the central hole in the second side of the backing plate is about 45 degrees.

15. The assembly of claim 11, wherein the end of the tube portion of the arbor mount opposite the enlarged terminal member is provided with external threads so that a nut may be utilized to secure the compression cup over the arbor mount and against the end wall of the workpiece.

16. The assembly of claim 15, wherein a spacer, having a hole therethrough that is adapted to receive the tube portion of the arbor mount, is placed over the arbor mount between the base of the cone and the nut.

17. The assembly of claim 15, wherein the nut is provided with a unitary spacer portion.

18. The assembly of claim 11, wherein the central recess on the first side of the backing plate is substantially circular.

19. The assembly of claim 11, wherein the means for securing the cone against the end wall of the workpiece comprises a spring that is adapted to be compressed between the inside of the compression cup and the larger end of the cone.

20. The assembly of claim 11, wherein the compression cup is provided with a spring that is adapted to bear against the larger end of the cone so as to maintain the cone in position against the end wall of the workpiece.

* * * * *